(12) United States Patent
Matsuki et al.

(10) Patent No.: US 10,075,070 B2
(45) Date of Patent: Sep. 11, 2018

(54) STEP-DOWN DC/DC CONVERTER

(71) Applicant: ROHM CO., LTD., Ukyo-Ku, Kyoto (JP)

(72) Inventors: Takeru Matsuki, Kyoto (JP); Koichi Miyanaga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/346,074

(22) Filed: Nov. 8, 2016

(65) Prior Publication Data

US 2017/0133929 A1   May 11, 2017

(30) Foreign Application Priority Data

Nov. 10, 2015   (JP) .................. 2015-220602

(51) Int. Cl.
| | |
|---|---|
| *H02M 3/156* | (2006.01) |
| *H02M 1/08* | (2006.01) |
| *H02M 1/32* | (2007.01) |
| H02M 1/00 | (2006.01) |

(52) U.S. Cl.
CPC ............. *H02M 3/156* (2013.01); *H02M 1/08* (2013.01); *H02M 1/32* (2013.01); *H02M 2001/0009* (2013.01)

(58) Field of Classification Search
CPC ...................................................... H02M 3/00
See application file for complete search history.

(56) References Cited

U.S. PATENT DOCUMENTS

| | | | | |
|---|---|---|---|---|
| 2009/0243580 A1* | 10/2009 | Chen | ...................... | H02M 3/156 323/288 |
| 2014/0339009 A1* | 11/2014 | Suzuki | ..................... | B60K 1/00 180/232 |
| 2015/0023070 A1* | 1/2015 | Nate | ................. | H02M 3/33507 363/21.17 |
| 2015/0061611 A1* | 3/2015 | Li | ....................... | H02M 3/1588 323/235 |
| 2016/0036322 A1* | 2/2016 | Miyamae | .............. | H02M 3/156 323/284 |

FOREIGN PATENT DOCUMENTS

JP          2011014738 A        1/2011

* cited by examiner

*Primary Examiner* — Nguyen Tran
*Assistant Examiner* — Trinh Q Dang
(74) *Attorney, Agent, or Firm* — Cantor Colburn LLP

(57) ABSTRACT

A pulse generator includes a mode controller that detects a state in which there has been no transition of a pulse signal to the off level for a given cycle (period). When such a state is detected, the pulse generator transits to a skip mode. In the skip mode, the period is repeatedly switched between: (i) a first period in which the pulse signal is maintained at the on level over multiple cycles; and (ii) a second period in which the pulse signal is forcibly switched to the off level so as to charge the bootstrap capacitor by means of a bootstrap circuit.

15 Claims, 8 Drawing Sheets

240d

240e

STEP-DOWN DC/DC CONVERTER

CROSS-REFERENCE TO RELATED APPLICATIONS

This application is based upon and claims the benefit of priority from the prior Japanese Patent Application No. 2015-220602, filed Nov. 10, 2015, the entire contents of which are incorporated herein by reference.

BACKGROUND OF THE INVENTION

1. Field of the Invention

The present invention relates to a DC/DC converter employing a bootstrap method.

2. Description of the Related Art

Various kinds of electronic devices employ a DC/DC converter that converts a DC voltage having a given voltage value into a DC voltage having a different voltage value. FIG. 1 is a circuit diagram showing a step-down DC/DC converter (Buck converter). A DC/DC converter 100R receives a DC input voltage $V_{IN}$ via an input terminal 102, and generates an output voltage $V_{OUT}$ having a reduced voltage value at an output terminal 104. The DC/DC converter 100R includes an output circuit 110R and a control circuit 200R. The output circuit 110R mainly includes a switching transistor M1, an inductor L1, a rectifier diode D1, and an output capacitor C1. The output capacitor C1 is connected to the output terminal 104. One end of the inductor L1 is connected to a switching (LX) terminal of the control circuit 200R. The other end of the inductor L1 is connected to the output terminal 104. The rectifier diode D1 is arranged such that its anode is grounded and its cathode is connected to the LX terminal.

The switching transistor M1 is built into the control circuit 200R. A VCC terminal of the control circuit 200R is connected to the input terminal 102. The DC input voltage $V_{IN}$ is supplied to the VCC terminal. The switching transistor M1 is configured as an N-channel MOSFET, which is arranged such that its source is connected to the LX terminal and its drain is connected to the VCC terminal.

A detection terminal (VS) receives, as a feedback signal, a signal that indicates the state (current state, voltage state, electric power state, or the like) of the DC/DC converter 100R or otherwise the state of a load (not shown) connected to the output terminal 104. A pulse generator 202 generates a pulse signal (high-side pulse signal) S1 having a factor such as a duty ratio, frequency, or otherwise a combination thereof that is changed such that the state of the DC/DC converter 100R or otherwise the state of the load approaches a target state. For example, in a case in which the DC/DC converter 100R is configured as a constant voltage output DC/DC converter, the pulse generator 202 generates the high-side pulse signal S1 such that the output voltage $V_{OUT}$ approaches a target voltage $V_{REF}$. In a case in which the DC/DC converter 100R is configured as a constant current output DC/DC converter, the pulse generator 202 generates the high-side pulse signal S1 such that a current $I_{OUT}$ that flows through the load approaches a target value $I_{REF}$.

A driver 204 switches on and off the switching transistor M1 according to the high-side pulse signal S1. In a case in which the switching transistor M1 is configured as an N-channel MOSFET as described above, in order to turn on the switching transistor M1, there is a need to apply a voltage to the gate of the switching transistor M1 that is higher than the voltage between its drain and source (i.e., input voltage $V_{IN}$). In order to supply such a voltage, a bootstrap circuit 210 is arranged. The bootstrap circuit 210 includes a bootstrap capacitor C2, a rectifier element 212, a transistor 214, and a bootstrap power supply circuit 220. The bootstrap capacitor C2 is arranged in the form of an external component between the LX terminal and a bootstrap (BST) terminal. The bootstrap power supply circuit 220 generates a constant voltage $V_{CCBST}$. The rectifier element 212 is arranged between the BST terminal and an output of the bootstrap power supply circuit 220. The transistor 214 is arranged between the LX terminal and the ground. The voltage $V_{BST}$ at the BST terminal is supplied to the upper-side power supply terminal of the driver 204.

During a period in which the switching transistor M1 is turned off, the transistor 214 is turned on, which grounds one end (LX-side end) of the bootstrap capacitor C2. In this state, the voltage $V_{CCBST}$ is applied to the other end (BST-side end) of the bootstrap capacitor C2 via the rectifier element 212. Accordingly, the bootstrap capacitor C2 is charged using the voltage across both ends thereof represented by ($V_{CCBST}-V_F$). Here, $V_F$ represents the forward voltage of the rectifier element 212. Such an arrangement is designed such that the relation $V_{CCBST}-V_F > V_{GS(TH)}$ holds true. Here, $V_{GS(TH)}$ represents a gate-source threshold voltage of the switching transistor M1.

In the turned-on period of the switching transistor M1, with the source voltage of the switching transistor M1 as $V_{LX}$, the voltage $V_{BST}$ at the BST terminal is represented by $V_{BST}=V_{Lx}+(V_{CCBST}-V_F)$. The driver 204 uses the voltage $V_{BST}$ as a high-level voltage to be applied to the gate of the switching transistor M1. In this period, the gate-source voltage $V_{GS}$ is represented by $V_{GS}=V_{BST}-V_{LX}=(V_{CCBST}-V_F)$. That is to say, the relation $V_{GS}>V_{GS(TH)}$ holds true. Thus, the switching transistor M1 is turned on.

As a result of investigating such a DC/DC converter 100R shown in FIG. 1, the present inventors have come to recognize the following problem. With the step-down DC/DC converter, in a steady state, the switching duty ratio D of the switching transistor M1 is determined according to the ratio between the input voltage $V_{IN}$ and the output voltage $V_{OUT}$, as represented by $D=V_{OUT}/V_{IN}$.

Accordingly, in a state in which the output voltage $V_{in}$ becomes a value in the vicinity of the input voltage $V_{out}$, the duty ratio rises to almost 100%. Such a state occurs in a reduced voltage state in which the input voltage $V_{IN}$ falls, for example. In a case in which the step-down DC/DC converter includes the switching transistor M1 configured as a P-channel MOSFET, by supplying the driving signal having a duty ratio of 100% (i.e., an always-on signal) to the gate of the switching transistor M1, such an arrangement is capable of generating the output voltage $V_{OUT}$ having a voltage value in the vicinity of the input voltage $V_{IN}$.

However, in a case in which the switching transistor M1 is configured as an N-channel MOSFET as shown in FIG. 1, such an arrangement does not supply the gate driving signal with a duty ratio of 100%. This is because the bootstrap capacitor C2 is charged in an off period of the switching transistor M1. If the switching transistor M1 is fixedly turned on, there is no time for charging the bootstrap capacitor C2. This leads to a reduction in the voltage $V_{BST}$ at the BST terminal, resulting in the gate-source voltage of the switching transistor M1 becoming lower than the threshold voltage $V_{GS(TH)}$. This leads to a problem in that the switching transistor M1 cannot be maintained in the on state.

In order to solve such a problem, with the control circuit 200R including the bootstrap circuit 210, a maximum value (which will be referred to as the "maximum duty ratio $D_{MAX}$") is set for the duty ratio of the gate driving signal to be applied to the switching transistor M1 so as to generate the high-side pulse signal S1 in a range such that it does not exceed the maximum duty ratio $D_{MAX}$. This means that the range of the input voltage $V_{IN}$ (input voltage range) that can be employed to generate a desired output voltage $V_{OUT}$ is limited such that the relation $V_{IN} > V_{OUT}/D_{MAX}$ holds true. As the maximum duty ratio $D_{MAX}$ becomes larger, the lower limit of the input voltage range can become lower. For example, with the pulse generator 202 configured as a PWM pulse generator, the maximum duty ratio $D_{MAX}$ is limited to on the order of 90% due to various kinds of limitations such as circuit response delay and the like.

SUMMARY OF THE INVENTION

The present invention has been made in order to solve such a problem. Accordingly, it is an exemplary purpose of an embodiment of the present invention to provide a step-down DC/DC converter with an improved maximum duty ratio and a control circuit of such a step-down DC/DC converter.

An embodiment of the present invention relates to a control circuit for controlling a step-down DC/DC converter including an N-channel switching transistor. The control circuit comprises: a pulse generator structured to generate a pulse signal for instructing the switching transistor to turn on and off such that an output voltage of the step-down DC/DC converter approaches a target value; a switching terminal to be coupled to a source of the switching transistor, and to be coupled to one end of a bootstrap capacitor; a bootstrap terminal to be coupled to another end of the bootstrap capacitor; a bootstrap circuit structured to charge the bootstrap capacitor; and a driver having an upper-side power supply terminal coupled to the bootstrap terminal and having a lower-side power supply terminal coupled to the switching terminal, and structured to drive the switching transistor according to the pulse signal. The pulse generator comprises a mode controller structured to detect a state in which there has been no transition to an off level in the pulse signal for a given cycle (period). The pulse generator is structured to transit to a skip mode when such a state is detected. In the skip mode, the pulse generator repeatedly switches a period between: (i) a first period in which the pulse signal is maintained at an on level over multiple cycles; and (ii) a second period in which the pulse signal is forcibly switched to the off level so as to charge the bootstrap capacitor by means of the bootstrap circuit.

In the skip mode, the switching frequency of the switching transistor is reduced. By inserting the second period in which the bootstrap capacitor is charged, such an arrangement prevents the voltage across the bootstrap capacitor from falling. With the length of the first period as $T_{ON}$, and with the length of the second period as $T_{OFF}$, the effective duty ratio provided in the skip mode is represented by $T_{ON}/(T_{ON}+T_{OFF})$. Such an arrangement provides an effective duty ratio that is greater than the pulse-by-pulse maximum duty ratio $D_{MAX}$.

Also, the pulse generator may comprise an off signal generating unit structured to generate an off signal that functions as a trigger for switching the pulse signal to an off level. Also, the mode controller may be structured to monitor the off signal so as to detect a cycle in which there has been no assertion of the off signal. By monitoring the off signal, such an arrangement is capable of detecting whether or not the input voltage is in the vicinity of the output voltage.

Also, the mode controller may be structured to monitor the pulse signal so as to detect a cycle in which there has been no transition of the pulse signal to an off level. By monitoring the pulse signal, such an arrangement is capable of detecting whether or not the input voltage is in the vicinity of the output voltage.

Also, when a predetermined number of cycles elapses after a transition to the first period, the pulse generator may transit to the second period. By defining the length of the first period in increments of the period $T_P$ set for the PWM control operation, such an arrangement allows the first period to be controlled in a simple manner. Furthermore, such an arrangement is capable of generating a trigger in a simple manner for a transition from the first period to the second period.

Also, the pulse generator may further comprise: an oscillator structured to generate a PWM (pulse width modulation) clock that defines a switching period for the switching transistor; and a counter structured to count the PWM clock. The pulse generator may be structured to transit to the second period when a count value of the counter reaches a predetermined number after a transition to the first period.

The pulse generator may be structured to transit to the second period when a predetermined time period elapses after a transition to the first period.

Such an arrangement allows the length of the first period to be set as desired without involving the PWM frequency. For example, such an arrangement that allows the switching frequency to be selected as desired has an advantage in a case in which the switching noise involved in the skip mode becomes a problem in relation to EMI (electromagnetic interference).

The pulse generator may further comprise a timer circuit. The pulse generator may be structured to transit to the second period when the timer circuit detects that a predetermined time period has elapsed after a transition to the first period.

The pulse generator may be structured to transit to the second period when a voltage across the bootstrap capacitor falls to a predetermined value after a transition to the first period.

With such an arrangement, the first period is maintained during a period in which the voltage across the bootstrap capacitor is sufficient. Thus, such an arrangement provides a maximum duty ratio that is allowed for each circuit operation state.

The pulse generator may comprise: an error amplifier structured to amplify a difference between a voltage detection signal that indicates the output voltage and a target value thereof, so as to generate a feedback signal that corresponds to the difference; an oscillator structured to generate an on signal that is asserted for every predetermined period; a comparator structured to generate an off signal that is asserted when a current detection signal that indicates a current that flows through the switching transistor reaches the feedback signal; and a logic circuit structured to generate the pulse signal that is switched to an on level according to an assertion of the on signal, and that is switched to an off level according to an assertion of the off signal. The mode controller may be structured to monitor the off signal so as to detect a cycle in which there has been no assertion of the off signal.

Such an arrangement allows such a peak current mode modulator to provide such a transition to the skip mode.

The pulse generator may comprise: an error amplifier structured to amplify a difference between a voltage detection signal that indicates the output voltage and a target value thereof, so as to generate a feedback signal that corresponds to the difference; an oscillator structured to generate a cyclic signal which is one from among a triangle wave, a sawtooth wave, and a ramp wave; and a comparator structured to compare the feedback signal with the cyclic signal. The mode controller may be structured to monitor an output signal of the comparator so as to detect a cycle in which there has been no transition of the output signal of the comparator.

Such an arrangement allows such a voltage mode modulator to provides such a transition to the skip mode.

Another embodiment of the present invention also relates to a control circuit for controlling a step-down DC/DC converter including an N-channel switching transistor. The control circuit comprises: a pulse generator structured to generate a pulse signal for instructing the switching transistor to turn on and off such that an output voltage of the step-down DC/DC converter approaches a target value; a switching terminal to be coupled to a source of the switching transistor and to be coupled to one end of a bootstrap capacitor; a bootstrap terminal to be coupled to another end of the bootstrap capacitor; a bootstrap circuit structured to charge the bootstrap capacitor; and a driver having an upper-side power supply terminal coupled to the bootstrap terminal and having a lower-side power supply terminal coupled to the switching terminal, and structured to drive the switching transistor according to the pulse signal. The pulse generator is structured to switch between a first period and a second period repeatedly when a voltage difference between an input voltage and an output of the step-down DC/DC converter becomes smaller than a predetermined value. In the first period, the pulse signal is maintained at an on level over multiple cycles. In the second period, the pulse signal is forcibly switched to the off level so as to charge the bootstrap capacitor by means of the bootstrap circuit.

Also, the control circuit according to an embodiment may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

Yet another embodiment of the present invention relates to a step-down DC/DC converter. The step-down DC/DC converter comprises any one of the aforementioned control circuits.

Yet another embodiment of the present invention relates to an in-vehicle power supply apparatus. The in-vehicle power supply apparatus comprises the aforementioned step-down DC/DC converter.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Also, the phrase "a signal A (voltage or current) corresponds to a signal B (voltage or current)" means the state in which the signal A has a correlation with the signal B. Specific examples of such a state include: (i) a state in which the signal A is the same as the signal B; (ii) a state in which the signal A is proportional to the signal B; (iii) a state in which the signal A is obtained by shifting the level of the signal B; (iv) a state in which the signal A is obtained by amplifying the signal B; (v) a state in which the signal A is obtained by inverting the signal B; (vi) a desired combination of the aforementioned states (i) through (v); and the like. The range of "corresponds" as described above is determined by the kinds of the signals A and B and the usage of the signals A and B, which can clearly be understood by those skilled in this art.

Figure 1:
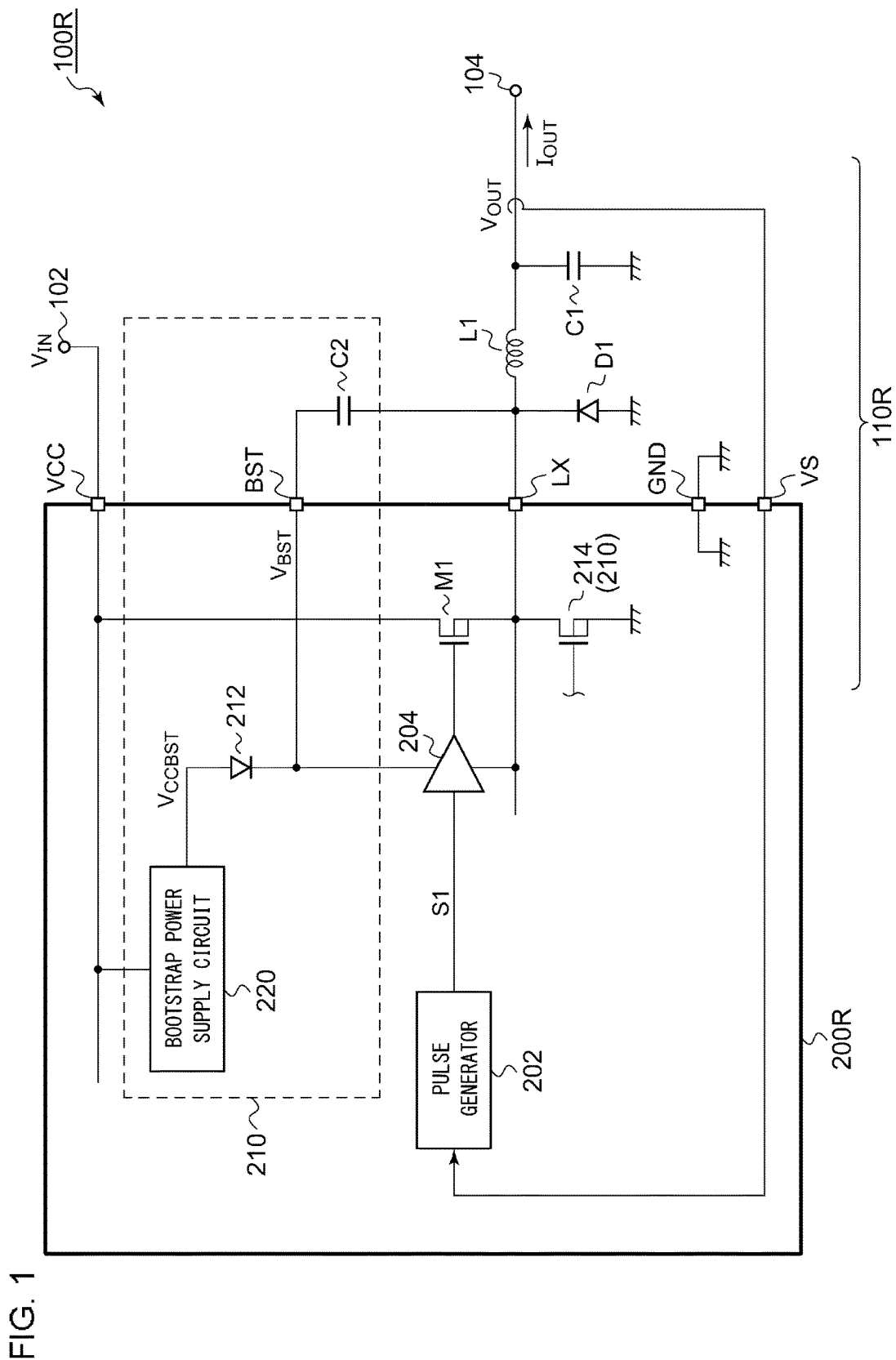
FIG. 1 is a circuit diagram showing a step-down DC/DC converter.
Figure 2:
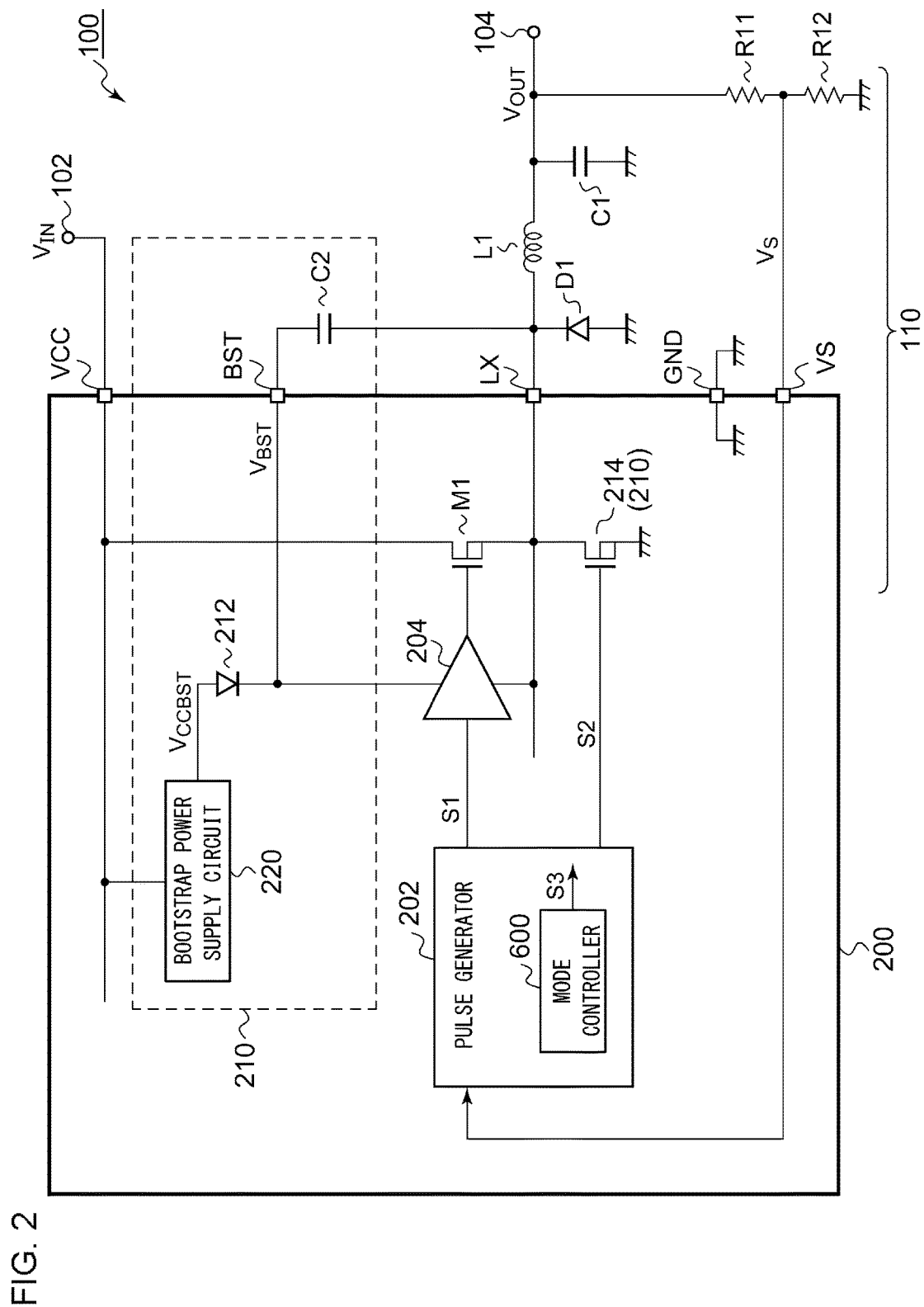
FIG. 2 is a circuit diagram showing a step-down DC/DC converter according to an embodiment.

FIG. 2 is a circuit diagram showing a step-down DC/DC converter (which will simply be referred to as the "DC/DC converter") 100 according to an embodiment. As with the arrangement shown in FIG. 1, the DC/DC converter 100 receives a DC input voltage $V_{IN}$ via an input terminal 102, and generates an output voltage $V_{OUT}$ having a reduced voltage value at an output terminal 104. The DC/DC converter 100 includes an output circuit 110 and a control circuit 200. Description will be made in the present embodiment as an example regarding a constant voltage output DC/DC converter.

The output circuit 110 includes resistors R11 and R12 in addition to the components of the output circuit 110R shown in FIG. 1. The resistors R11 and R12 are used to divide the output voltage $V_{OUT}$ to be controlled, so as to generate a voltage detection signal $V_S$. The voltage detection signal $V_S$ thus obtained is supplied to a voltage detection (VS) terminal of the control circuit 200. The resistors R11 and R12 may be built into the control circuit 200.

The control circuit 200 includes a pulse generator (which will also be referred to as the "pulse modulator") 202, a driver 204, and a bootstrap circuit 210 in addition to the switching transistor M1 configured as an N-channel MOSFET. The control circuit 200 is configured as a function IC (Integrated Circuit) monolithically integrated on a single semiconductor substrate. The switching transistor M1 is arranged such that its drain is connected to a VCC terminal and such that its source is connected to an LX terminal.

The pulse generator 202 generates a pulse signal (which will be referred to as the "high-side pulse signal") S1 having a factor such as a duty ratio, frequency, or a combination thereof that is changed such that the voltage $V_{OUT}$ at the output terminal 104 of the DC/DC converter 100 approaches its target value, and specifically such that the voltage detection signal $V_S$ that corresponds to the output voltage $V_{OUT}$ approaches its target value $V_{REF}$. Furthermore, the pulse generator 202 generates a low-side pulse signal S2 for controlling a transistor 214. The low-side pulse signal S2 may be configured as a complementary signal of the high-side pulse signal S1. Also, dead time may be set for the high-side pulse signal S1 and the low-side pulse signal S2 in order to prevent the switching transistor M1 and the transistor 214 from turning on at the same time.

The pulse generator 202 may be configured using known techniques. The control method and the configuration thereof are not restricted in particular. Various kinds of control methods may be employed, examples of which include a voltage mode control method, a peak current mode control method, an average current mode control method, a hysteresis control (Band-Band) method, a bottom detection on-time fixed (COT: Constant On Time) method, and the like. Examples of the modulation method that can be employed for modulating the high-side pulse signal S1 include a pulse width modulation method, a pulse frequency modulation method, and the like. The pulse modulator 202 may be configured as an analog circuit employing an error amplifier and a comparator, a processor that performs digital calculation, or otherwise a combination of such an analog circuit and a digital circuit. Also, the pulse generator 202 may switch the control method according to the state of the load.

The driver 204 switches on and off the switching transistor M1 according to the high-side pulse signal S1. In a case in which the switching transistor M1 is configured as an N-channel transistor as described above, in order to turn on the switching transistor M1, there is a need to apply a voltage to the gate of the switching transistor M1 that is higher than its drain-source voltage (i.e., the input voltage $V_{IN}$). In order to meet such a requirement, the bootstrap circuit 210 is provided. The bootstrap circuit 210 has the same configuration as described with reference to FIG. 1. The bootstrap power supply circuit 220 generates a constant voltage $V_{CCBST}$. The rectifier element 212 is arranged between the BST terminal and the output of the bootstrap power supply circuit 220. The transistor 214 is arranged between the LX terminal and the ground. The driver 204 is arranged such that the voltage $V_{BST}$ at the BST terminal is supplied to its upper-side power supply terminal, and such that its lower-side power supply terminal is connected to the LX terminal. During the charging period for the bootstrap capacitor C2, a driver 216 turns on the transistor 214 according to the low-side pulse signal S2.

In the off period of the switching transistor M1, the transistor 214 is turned on, which connects one end (LX-side end) of the bootstrap capacitor C2 to the ground. In this state, the voltage $V_{CCBST}$ is applied to the other end (BST-side end) of the bootstrap capacitor C2 via the rectifier element 212, thereby charging the bootstrap capacitor C2 using the voltage represented by $(V_{CCBST}-V_F)$ applied to both ends thereof. Here, $V_F$ represents the forward voltage of the rectifier element 212. Such an arrangement is designed such that the relation $V_{CCBST}-V_F>V_{GS(TH)}$ holds true. Here, $V_{GS(TH)}$ represents the gate-source threshold voltage of the switching transistor M1. The rectifier element 212 may be configured as a switch that switches its state between the on state and the off state in synchronization with the switching transistor M1.

With the source voltage of the switching transistor M1 as $V_{LX}$, in the on period of the switching transistor M1, the voltage $V_{BST}$ at the BST terminal is represented by $V_{BST}=V_{LX}+(V_{CCBST}-V_F)$. The driver 204 uses the voltage $V_{BST}$ as a high-level voltage, which is applied to the gate of the switching transistor M1. In this state, the gate-source voltage $V_{GS}$ of the switching transistor M1 is represented by $V_{GS}=V_{BST}-V_{LX}=(V_{CCBST}-V_F)$. With such an arrangement, the relation $V_{GS}>V_{GS(TH)}$ holds true. Accordingly, the switching transistor M1 is turned on.

The pulse generator 202 includes a mode controller 600. When the mode controller 600 detects a state (which will be referred to as the "maximum duty ratio state") in which the high-side pulse signal S1 has not transited to the off level for a given cycle (a given switching period of the switching transistor M1), the mode controller 600 asserts the mode control signal S3. It can be understood that the assertion of the mode control signal S3 indicates that the duty ratio of the switching transistor M1 has exceeded a maximum value, i.e., that the difference between the input voltage $V_{IN}$ and the output voltage $V_{OUT}$ has become smaller than a predetermined value.

When the mode control signal S3 is asserted, the pulse generator 202 transits from a normal mode to a skip mode. In the skip mode, the pulse generator 202 repeatedly switches between (i) a first period (which will also be referred to as the "fixed-on period" $T_1$ in which the high-side pulse signal S1 is maintained at the on level over multiple cycles, and (ii) a second period (which will also be referred to as the "charging period") $T_2$ configured as a short period in which the high-side pulse signal S1 is forcibly switched to the off level and the bootstrap capacitor C2 is charged by means of the bootstrap circuit 210. That is to say, during the first period $T_1$, the high-side pulse signal S1 is fixedly set to the on level and the low-side pulse signal S2 is fixedly set to the off level. During the second period $T_2$, the high-side pulse signal S1 is set to the off level, and the low-side pulse signal S2 is set to the on level.

During the first period $T_1$, the bootstrap capacitor C2 is not charged. Accordingly, the voltage $V_{BST}$ at the BST terminal gradually drops with time. Thus, the first period $T_1$ is preferably designed to have a length such that the voltage $V_{BST}$ at the BST terminal is maintained so as to ensure the on state of the switching transistor M1.

Figure 3:
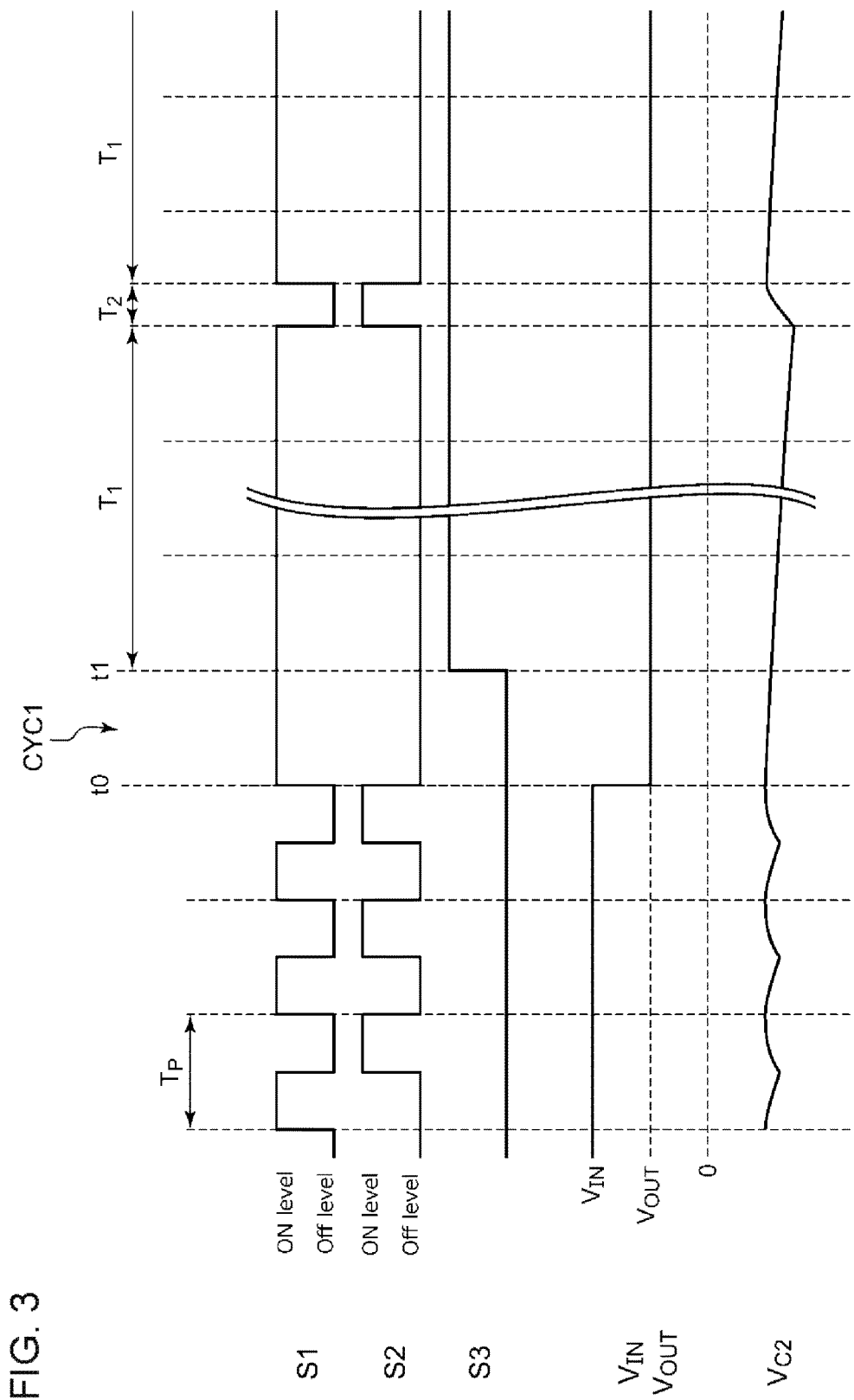
FIG. 3 is an operation waveform diagram showing the operation of the DC/DC converter shown in FIG. 2.

The above is the configuration of the DC/DC converter 100 including the control circuit 200. Next, description will be made regarding the operation thereof. FIG. 3 is an operation waveform diagram showing the operation of the DC/DC converter 100 shown in FIG. 2. It should be noted that the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding. Also, for ease of understanding and simplification of explanation, the waveform diagram in FIG. 3 shows the operation of the control circuit 200 in a case in which the response delay is ignored. Before the time point t0, the DC/DC converter 100 is in a steady state in which the input voltage $V_{IN}$ is sufficiently higher than the output voltage $V_{OUT}$. In this state, the high-side pulse signal S1 is generated with a stable duty ratio represented by $D=V_{OUT}/V_{IN}$, and the DC/DC converter 100 operates in the normal mode.

At the time point t0, the input voltage $V_{IN}$ falls to the vicinity of the output voltage $V_{OUT}$. In this state, the duty ratio of the high-side pulse signal S1 is raised to 100%. As a result, in the cycle CYC1, the high-side pulse signal S1 does not transit to the off level (maximum duty state). When the mode controller 600 detects such a cycle CYC1, the mode controller 600 asserts the mode control signal S3 at the time point t1, which instructs the pulse generator 202 to transit to the skip mode.

In the skip mode, during the first period $T_1$ which continues over multiple cycles, the switching transistor M1 is maintained in the on state. When the first period $T_1$ is switched to the second period $T_2$, the high-side pulse signal S1 is forcibly set to the off level, and the low-side pulse signal S2 is switched to the high level. In this state, the bootstrap capacitor C2 is charged, thereby raising the voltage $V_{C2}$ across the bootstrap capacitor C2. In the skip mode, the first period $T_1$ and the second period $T_2$ are alternately and repeatedly switched. In a subsequent stage, when the input voltage $V_{IN}$ rises again, low-level transition occurs in the high-side pulse signal S1. In this stage, the skip mode is canceled, and the operation mode returns to the normal mode.

The above is the operation of the DC/DC converter 100. With the DC/DC converter 100, when the duty ratio of the high-side pulse signal S1 becomes large, the operation mode is switched to the skip mode. In the skip mode, the switching transistor M1 operates with a reduced switching frequency and with an effective maximum duty ratio $D_{MAX}$ as represented by $D_{MAX}=T_1/(T_1+T_2)$. With a conventional pulse-by-pulse (cycle-by-cycle) control method, the maximum duty ratio is limited to on the order of at most 90% due to various kinds of limitations such as circuit response delay. For example, with the PWM period of the pulse generator 202 as $T_P$, in a case in which the first period $T_1$ is designed to have a length that is eight times greater than the PWM period $T_P$ and the second period $T_2$ is designed to have a length that is 40% of the PWM period $T_P$, such an arrangement provides an effective maximum duty ratio $D_{MAX}$ of approximately 95% as represented by $D_{MAX}=8/(0.4+8)\times100$.

As described above, with the DC/DC converter 100 shown in FIG. 2, such an arrangement is capable of generating the high-side pulse signal S1 with an improved maximum duty ratio $D_{MAX}$ in the reduced voltage state or the like. This allows the output voltage $V_{OUT}$ to be maintained at a target value even in a severe reduced voltage state as compared with conventional circuits.

The present invention encompasses various kinds of apparatuses and circuits that can be regarded as a block configuration or a circuit configuration shown in FIG. 2, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description will by no means be intended to restrict the technical scope of the present invention.

Figure 4:
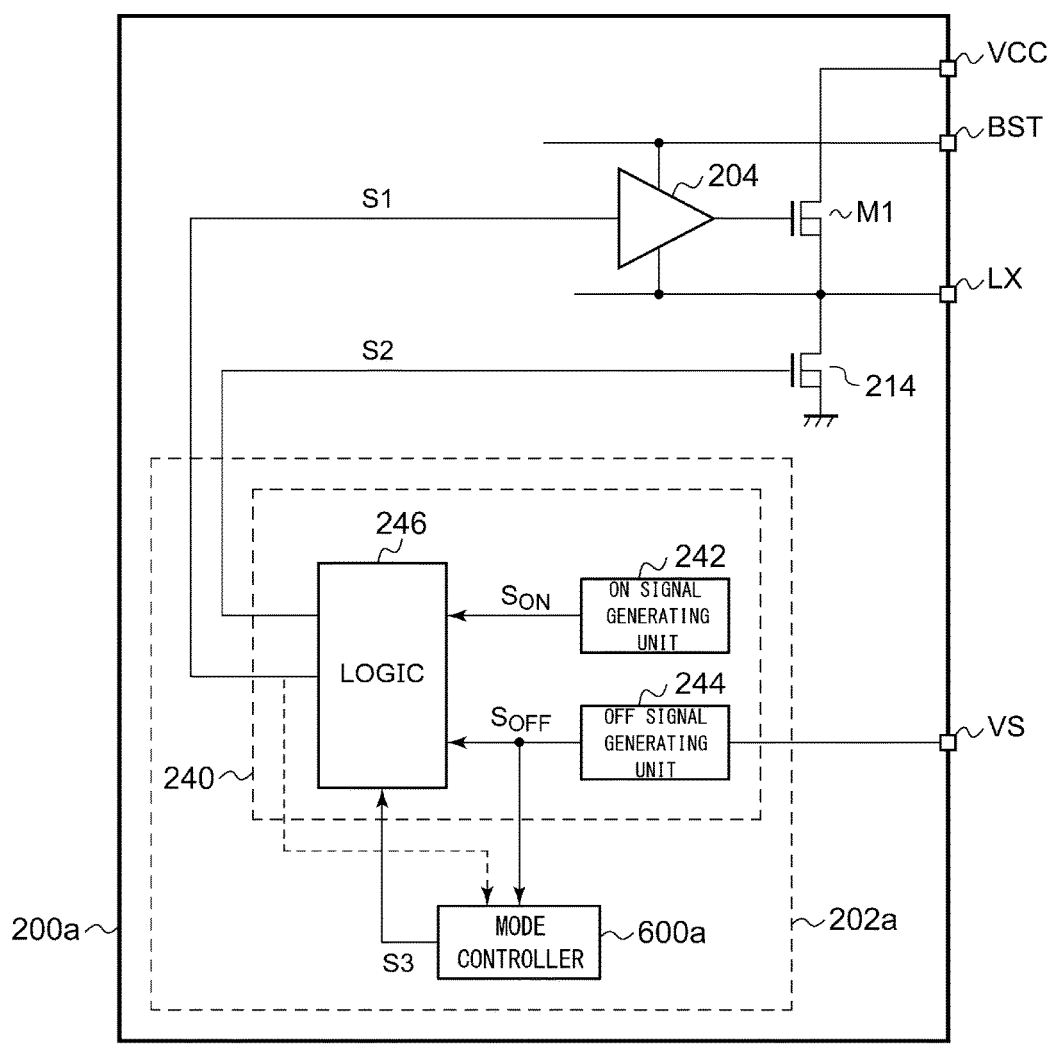
FIG. 4 is a circuit diagram showing a first example configuration of a control circuit.

FIG. 4 is a circuit diagram showing a first example configuration 200a of the control circuit 200. A pulse generator 202a includes a pulse modulator 240 and a mode controller 600a. The pulse modulator 240 generates the high-side pulse signal S1 and the low-side pulse signal S2 such that the voltage detection signal $V_S$ at the VS terminal approaches the target value $V_{REF}$.

The pulse modulator 240 includes an on signal generating unit 242, an off signal generating unit 244, and a logic circuit 246. The on signal generating unit 242 generates an on signal $S_{ON}$ that functions as a trigger for instructing the switching transistor M1 to turn on. The off signal generating unit 244 generates an off signal $S_{OFF}$ that functions as a trigger for instructing the switching transistor M1 to turn off. The logic circuit 246 generates the high-side pulse signal S1 based on the on signal $S_{ON}$ and the off signal $S_{OFF}$.

The mode controller 600a monitors the off signal $S_{OFF}$. When the mode controller 600a detects a cycle (period) in which the off signal $S_{OFF}$ has not been asserted, the mode controller 600a asserts the mode control signal S3, which instructs the pulse modulator 240 to transit to the skip mode. Also, when the off signal $S_{OFF}$ has been asserted in a given cycle in the skip mode, the mode controller 600a may negate the mode control signal S3 so as to instruct the pulse modulator 240 to return to the normal mode.

Also, the mode controller 600a may monitor the high-side pulse signal S1 as indicated by the broken arrow in the drawing, instead of or otherwise in addition to the off signal $S_{OFF}$. When the mode controller 600a detects a cycle in which there has been no transition to the off level in the high-side pulse signal S1, the mode controller 600a may assert the mode control signal S3. Also, in a case in which the low-side pulse signal S2 is configured as a complementary signal of the pulse signal S1, the mode controller 600a may generate the mode control signal S3 based on the low-side pulse signal S2. Also, the mode controller 600a may monitor an internal signal of the logic circuit 246 that relates to the high-side pulse signal S1 or otherwise the low-side pulse signal S2.

With the control circuit 200a shown in FIG. 4, the off signal $S_{OFF}$ or otherwise the high-side pulse signal S1 (low-side pulse signal S2) is monitored. Thus, such an arrangement is capable of detecting whether or not the switching transistor M1 has a large duty ratio, i.e., whether or not the input voltage $V_{IN}$ is in the vicinity of the output voltage $V_{OUT}$.

When a predetermined number of cycles (e.g., eight cycles) elapses after the pulse modulator 240 of the pulse generator 202a transits to the first period $T_1$, the pulse modulator 240 may transit to the second period $T_2$. By defining the length of the first period $T_1$ in increments of the period $T_P$ of the PWM control operation, such an arrangement allows the control operation to be performed in a simple manner. Furthermore, such an arrangement is capable of generating a trigger, which is used to perform transition from the first period $T_1$ to the second period $T_2$, by means of a counter or the like in a simple manner.

Figure 5:
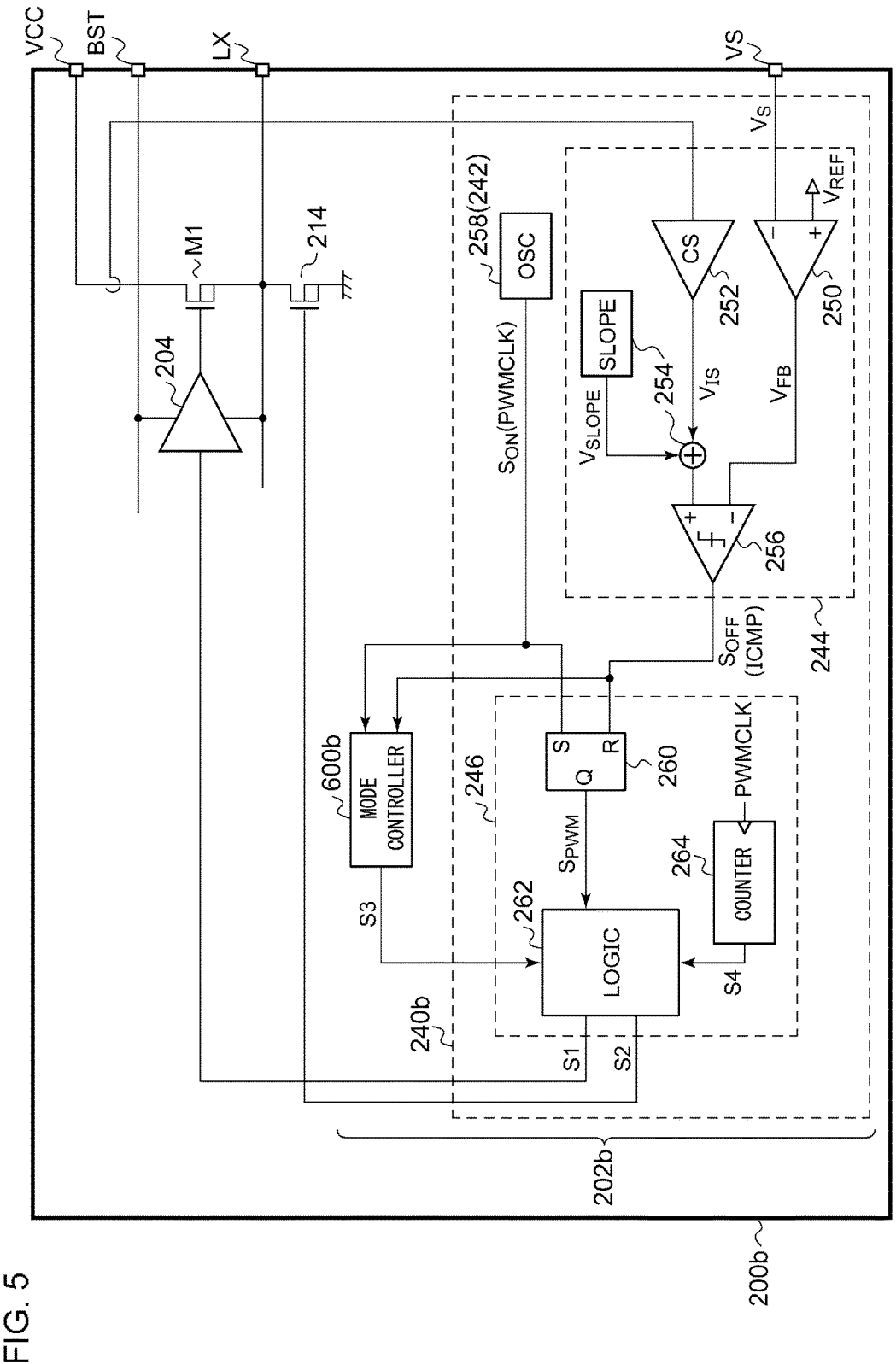
FIG. 5 is a circuit diagram showing a second example configuration of the control circuit.

FIG. 5 is a circuit diagram showing a second example configuration 200b of the control circuit 200. A pulse generator 202b of the control circuit 200b includes a pulse modulator 240b that operates in the peak current mode. An oscillator 258 generates a PWM (pulse width modulation) clock PWMCLK that defines the PWM period (switching period) $T_P$. The oscillator 258 corresponds to the on signal generating unit 242 shown in FIG. 4. The PWM clock PWMCLK is understood to correspond to the on signal $S_{ON}$.

The error amplifier 250 amplifies the difference between the voltage detection signal $V_S$ and the target value $V_{REF}$, and generates a feedback signal $V_{FB}$ that corresponds to the difference. A current sensing amplifier 252 generates a current detection signal $V_{IS}$ that indicates a current $I_{M1}$ that flows through the switching transistor M1. A slope compensator 254 superimposes a slope signal $V_{SLOPE}$ on either one of the feedback signal $V_{FB}$ or the current detection signal $V_{IS}$. A PWM controller 256 generates the off signal $S_{OFF}$ (which will also be referred to as the "ICMP signal") which is asserted when the current detection signal $V_{IS}$ reaches the feedback signal $V_{FB}$. The error amplifier 250 through the PWM comparator 256 correspond to the off signal generating unit 244 shown in FIG. 4.

The logic circuit 246 generates the pulse signal S1 which is switched to the on level according to an assertion of the on signal $S_{ON}$, and which is switched to the off level according to an assertion of the off signal $S_{OFF}$. For example, the logic circuit 246 may include an SR flip-flop (or latch) 260 that operates in response to the on signal $S_{ON}$ and the off signal $S_{OFF}$. The logic unit 262 generates the high-side pulse signal S1 and the low-side pulse signal S2 based on the output $S_{PWM}$ of the flip-flop 260. A counter 264 is arranged in order to determine the length of the first period $T_1$ to be set in the skip mode. Specifically, the counter 264 counts the PWM clock PWMCLK. When the count value reaches a predetermined number, the counter 264 asserts a transition signal S4. The logic unit 262 (or the flip-flop 260) switches the high-side pulse signal S1 and the low-side pulse signal S2 in response to the transition signal S4.

It should be noted that the configuration of the logic circuit 246 is not restricted in particular. Also, a circuit having the same functions can be configured as a combinational circuit, a sequential circuit, or a combination thereof, which is conceivable by those skilled in this art.

The mode controller 600b monitors the off signal $S_{OFF}$ which is an output of the PWM comparator 256. When there has been no assertion of the off signal $S_{OFF}$ in a PWM period $T_P$, the mode controller 600b asserts the mode control signal S3.

Figure 6:
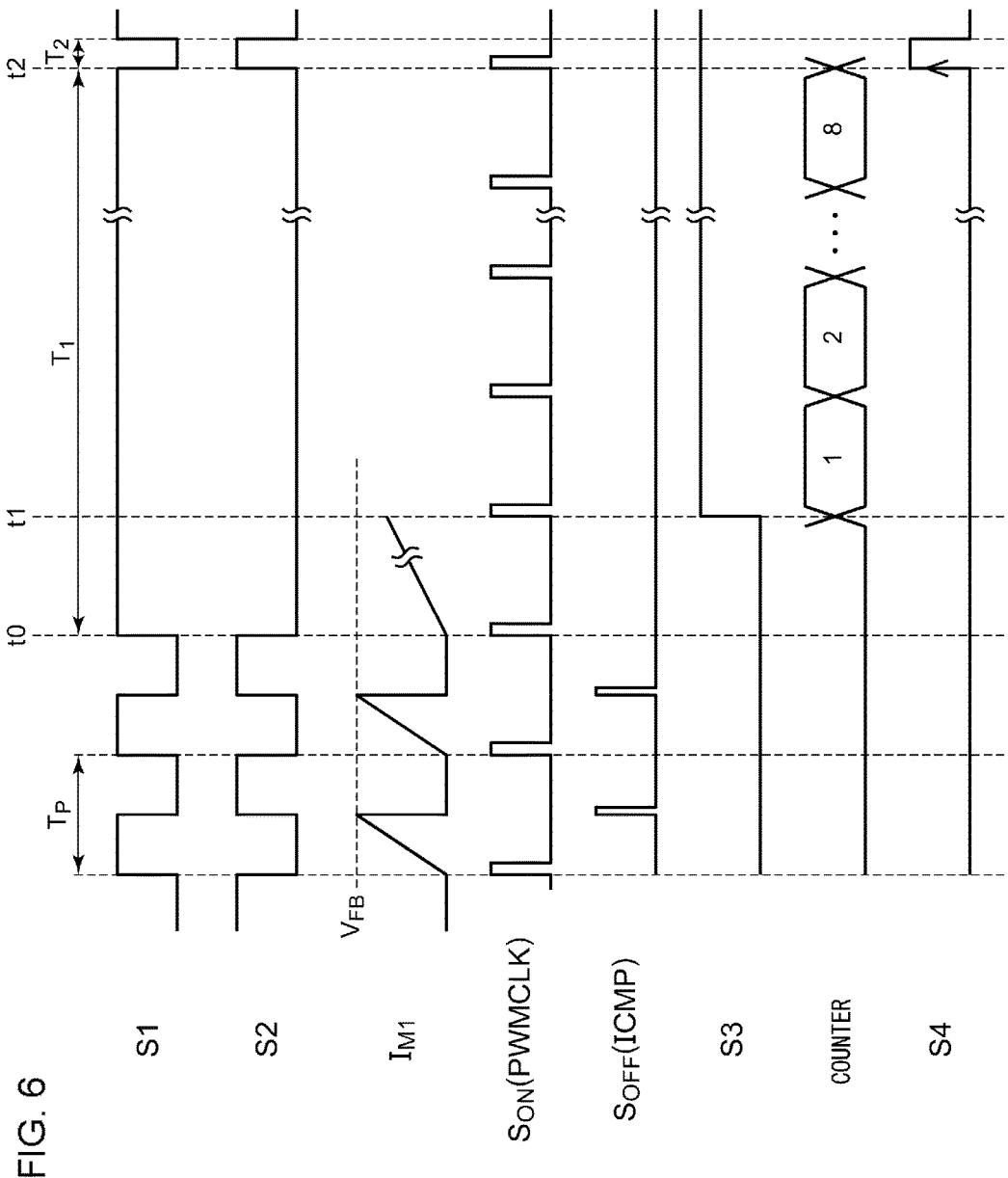
FIG. 6 is an operation waveform diagram showing the operation of the control circuit shown in FIG. 5.

FIG. 6 is an operation waveform diagram showing the operation of the control circuit 200b shown in FIG. 5. Before the time point t0, the DC/DC converter 100 is in a steady state in which the input voltage $V_{IN}$ is sufficiently higher than the output voltage $V_{OUT}$. In this state, the high-side pulse signal S1 is generated with a stable duty ratio represented by $D=V_{OUT}/V_{IN}$, and the DC/DC converter 100 operates in the normal mode.

At the time point t0, the input voltage $V_{IN}$ falls to the vicinity of the output voltage $V_{OUT}$. In this state, the duty ratio of the high-side pulse signal S1 is raised to 100%. As a result, in the cycle CYC1, the high-side pulse signal S1 does not transit to the off level (maximum duty state). When the mode controller 600 detects such a cycle CYC1, the mode controller 600 asserts the mode control signal S3 at the time point t1, which instructs the pulse generator 202 to transit to the skip mode.

After the transition to the skip mode, the counter 264 counts the PWM clock PWMCLK (on signal $S_{ON}$). When the count value reaches a predetermined number (eight in this example), the counter 264 asserts the transition signal S4 at the time point t2. Upon assertion of the transition signal S4, the period is switched to the second period $T_2$. In the second period $T_2$, the high-side pulse signal S1 is forcibly set to the off level, and the low-side pulse signal S2 is set to the high level. In the skip mode, the first period $T_1$ and the second period $T_2$ are alternately and repeatedly switched. Such a configuration allows the peak current mode control operation to appropriately provide such a skip mode.

Figure 7:
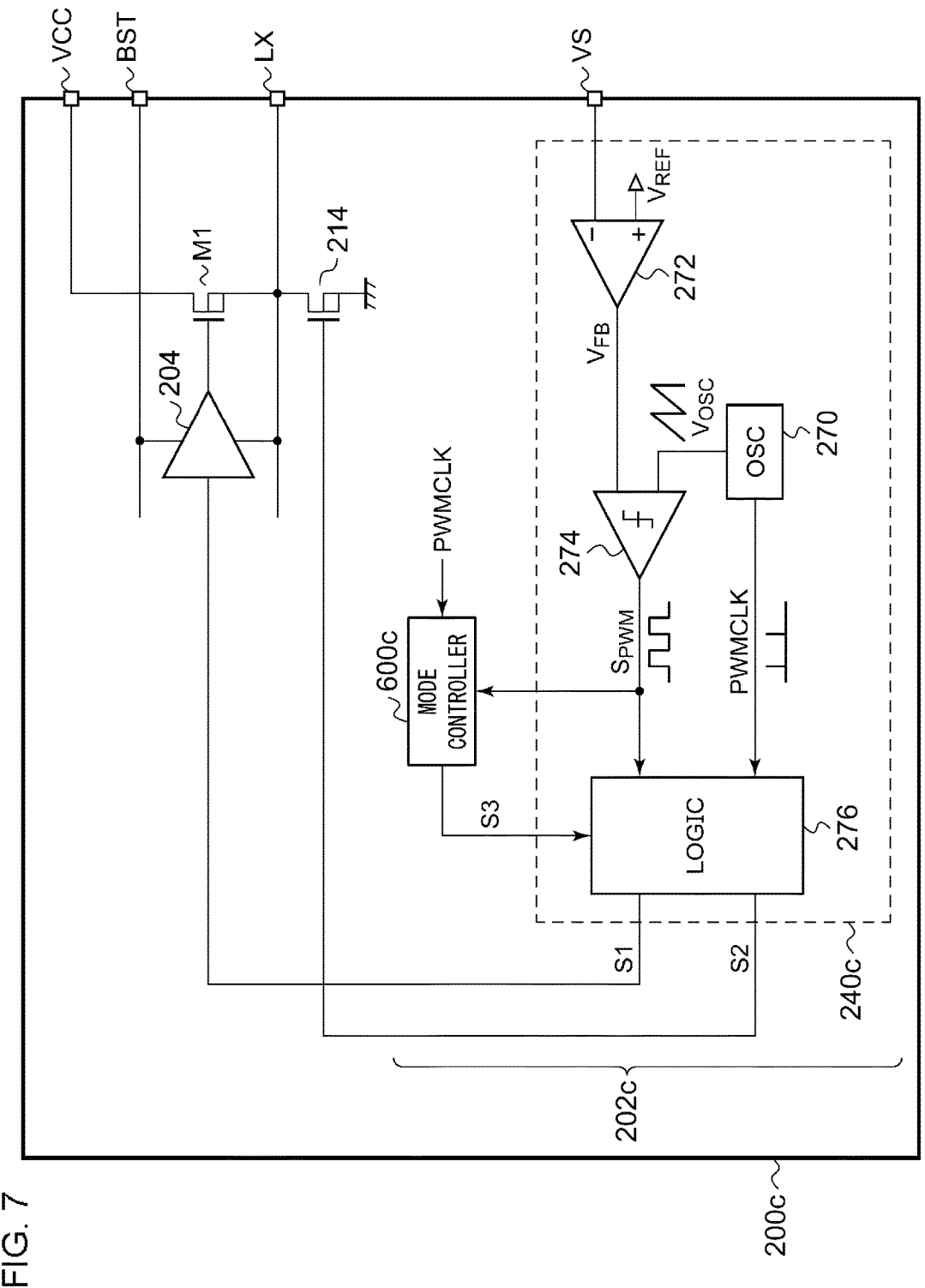
FIG. 7 is a circuit diagram showing a third example configuration of the control circuit.

FIG. 7 is a circuit diagram showing a third example configuration 200c of the control circuit 200. A pulse generator 202c of the control circuit 200c includes a pulse modulator 240c that operates in a voltage mode. An oscillator 270 generates the PWM (pulse width modulation) clock PWMCLK which defines the PWM period (switching period) $T_P$ and a cyclic signal $V_{OSC}$ which is any one of a triangle wave, a sawtooth wave, or a ramp wave. The error amplifier 272 amplifies the difference between the voltage detection signal $V_S$ and the target value $V_{REF}$, so as to generate a feedback signal $V_{FB}$. The PWM comparator 274 compares the feedback signal $V_{FB}$ and the cyclic signal $V_{OSC}$, and generates a PWM signal $S_{PWM}$ that represents the comparison result. A logic circuit 276 generates the high-side pulse signal S1 and the low-side pulse signal S2 based on the PWM signal $S_{PWM}$.

A mode controller 600c may monitor the PWM signal $S_{PWM}$ output from the PWM comparator 274. When the mode controller 600c detects a cycle in which there has been no transition of the PWM signal $S_{PWM}$ (a cycle in which there has been no edge), the mode controller 600c may assert the mode control signal S3. Also, in the skip mode, the logic circuit 276 may count the PWM clock PWMCLK so as to switch the period from the first period $T_1$ to the second period $T_2$.

Figure 8:
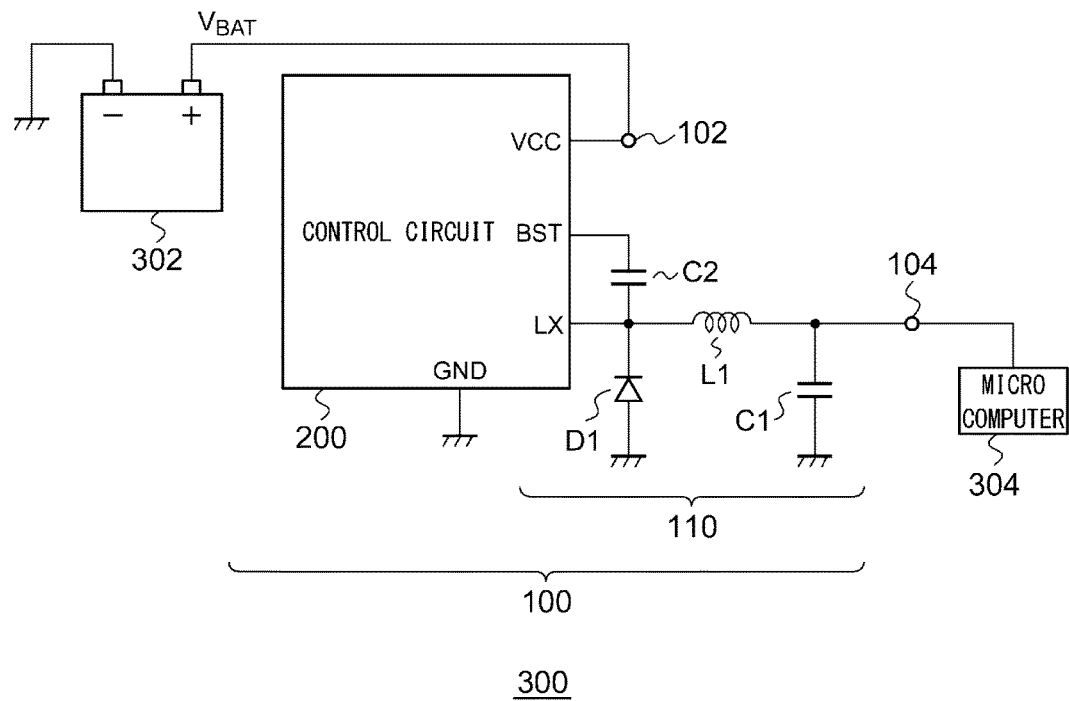
FIG. 8 is a circuit diagram showing an in-vehicle power supply apparatus.

Lastly, description will be made regarding a preferable usage of the DC/DC converter 100. FIG. 8 is a circuit diagram showing an in-vehicle power supply apparatus 300. The in-vehicle power supply apparatus 300 includes a battery 302 and a DC/DC converter 100. The battery 302 generates a DC voltage (battery voltage) $V_{BAT}$ of 12 V or otherwise 24 V. It should be noted that, with the battery voltage $V_{BAT}$, a constant rated voltage value cannot be obtained over time. Rather, the battery voltage $V_{BAT}$ varies in a wide range. The DC/DC converter 100 receives the battery voltage $V_{BAT}$ as the input voltage $V_{IN}$, steps down the input voltage $V_{IN}$ thus received, and supplies the voltage thus stepped down to a load such as a microcomputer 304 or the like. With the in-vehicle power supply apparatus 300, a reduced voltage state, which is the so-called "cold crank state", can potentially occur. The DC/DC converter 100 is required to operate normally even in such a cold crank state. As described above, the control circuit 200 is capable of providing a large duty ratio in the skip mode. Thus, it can be said that the control circuit 200 has an advantage in terms of performance in the reduced voltage state as compared with conventional techniques. From this viewpoint, the DC/DC converter 100 according to the embodiment is preferably applicable to the in-vehicle power supply apparatus 300.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Figure 9A:
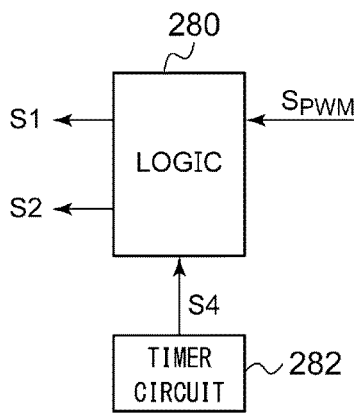
FIG. 9A is a circuit diagram showing a pulse modulator according to a first modification.

Description has been made in the embodiment regarding an arrangement in which, in the skip mode, the pulse modulator 240 inserts the second period $T_2$ for every predetermined number of cycles of the PWM period $T_P$. However, the present invention is not restricted to such an arrangement. FIG. 9A is a pulse modulator 240d according to a first modification. When a predetermined time period elapses after the transition to the first period $T_1$, the pulse modulator 240 may switch the period to the second period $T_2$. A logic unit 280 generates the high-side pulse signal S1 and the low-side pulse signal S2 based on the PWM signal $S_{PWM}$. The pulse modulator 240d includes a timer circuit (or otherwise a delay circuit) 282 configured as an analog circuit or otherwise a digital circuit instead of the counter. When the timer circuit 282 has counted a predetermined time period after the transition to the first period $T_1$, the timer circuit 282 may assert a transition signal S4 so as to switch the period to the second period $T_2$.

With such an arrangement, the length of the first period $T_1$ can be set as desired without involving the PWM period $T_P$. For example, such an arrangement that allows the switching frequency to be selected as desired has an advantage in connection with EMI in a case in which the switching noise involved in the skip mode becomes an EMI-related problem.

[Second Modification]

Figure 9B:
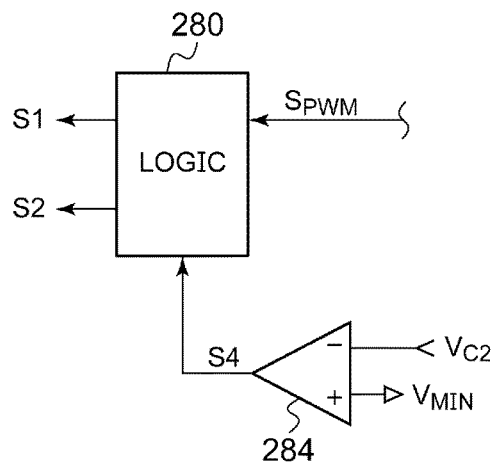
FIG. 9B is a circuit diagram showing a pulse modulator according to a second modification.

FIG. 9B is a circuit diagram showing a pulse modulator 240e according to a second modification. When a predetermined time period elapses after the transition to the first period $T_1$, the pulse modulator 240 may switch the period to the second period $T_2$. When the voltage $V_{C2}$ across the bootstrap capacitor C2 drops to a predetermined value $V_{MIN}$ after the transition to the first period $T_1$, the pulse modulator 240e may switch the period to the second period $T_2$. A comparator 284 compares the voltage $V_{C2}$ across the bootstrap capacitor C2 with the predetermined value $V_{MIN}$. When $V_{C2} < V_{MIN}$ holds true, the comparator 284 asserts the transition signal S4.

[Third Modification]

Description has been made in the embodiment regarding a diode rectification DC/DC converter. Also, the present invention is applicable to a synchronous rectification DC/DC converter. Such a modification may be made based on the circuit configuration shown in FIG. 2. That is to say, the rectifier diode D1 may be removed, and in order to allow the transistor 214 to function as a synchronous rectification transistor, the transistor 214 may preferably be configured to have a sufficiently large size so as to supply a coil current that flows through the inductor L1.

While the preferred embodiments of the present invention have been described using specific terms, such description is for illustrative purposes only, and it is to be understood that changes and variations may be made without departing from the spirit or scope of the appended claims.

What is claimed is:

1. A control circuit for controlling a step-down DC/DC converter including an N-channel switching transistor, the control circuit comprising:
    a pulse generator structured to generate a pulse signal for instructing the switching transistor to turn on and off such that an output voltage of the step-down DC/DC converter approaches a target value;
    a switching terminal to be coupled to a source of the switching transistor, and to be coupled to one end of a bootstrap capacitor;
    a bootstrap terminal to be coupled to another end of the bootstrap capacitor;
    a bootstrap circuit structured to charge the bootstrap capacitor; and
    a driver having an upper-side power supply terminal coupled to the bootstrap terminal and having a lower-side power supply terminal coupled to the switching terminal, and structured to drive the switching transistor according to the pulse signal,
    wherein the pulse generator comprises a mode controller structured to detect a state in which there has been no transition to an off level in the pulse signal for one cycle,
    and wherein, the pulse generator is structured to transit to a skip mode when such a state is detected by the mode controller, and wherein, the pulse generator is structured to repeatedly switch between a first period and a second period in the skip mode, wherein (i) in the first period, the pulse signal is maintained at an on level over a plurality of cycles and (ii) in the second period the pulse signal is forcibly switched to the off level so as to charge the bootstrap capacitor by means of the bootstrap circuit.

2. The control circuit according to claim 1, wherein the pulse generator comprises an off signal generating unit structured to generate an off signal that functions as a trigger for switching the pulse signal to an off level,
    and wherein the mode controller is structured to monitor the off signal so as to detect a cycle in which there has been no assertion of the off signal.

3. The control circuit according to claim 1, wherein the mode controller is structured to monitor the pulse signal so as to detect a cycle in which there has been no transition of the pulse signal to an off level.

4. The control circuit according to claim 1, wherein the pulse generator is structured to transit to the second period when a predetermined number of cycles elapses after a transition to the first period.

5. The control circuit according to claim 1, wherein the pulse generator is structured to transit to the second period when a predetermined time period elapses after a transition to the first period.

6. The control circuit according to claim 1, wherein the pulse generator is structured to transit to the second period when a voltage across the bootstrap capacitor falls to a predetermined value after a transition to the first period.

7. The control circuit according to claim 1, wherein the pulse generator comprises:
    an error amplifier structured to amplify a difference between a voltage detection signal that indicates the output voltage and a target value thereof, so as to generate a feedback signal that corresponds to the difference;
    an oscillator structured to generate an on signal that is asserted for every predetermined period;
    a comparator structured to generate an off signal that is asserted when a current detection signal that indicates a current that flows through the switching transistor reaches the feedback signal; and
    a logic circuit structured to generate the pulse signal that is switched to an on level according to an assertion of the on signal, and that is switched to an off level according to an assertion of the off signal, and wherein the mode controller is structured to monitor the off signal so as to detect a cycle in which there has been no assertion of the off signal.

8. The control circuit according to claim 1, wherein the pulse generator comprises:

an error amplifier structured to amplify a difference between a voltage detection signal that indicates the output voltage and a target value thereof, so as to generate a feedback signal that corresponds to the difference;

an oscillator structured to generate a cyclic signal which is one from among a triangle wave, a sawtooth wave, and a ramp wave; and a comparator structured to compare the feedback signal with the cyclic signal, and wherein the mode controller is structured to monitor an output signal of the comparator so as to detect a cycle in which there has been no transition of the output signal of the comparator.

9. The control circuit according to claim 1, monolithically integrated on a single semiconductor substrate.

10. A step-down DC/DC converter comprising the control circuit according to claim 1.

11. The control circuit according to claim 4, wherein the pulse generator further comprises:

an oscillator structured to generate a PWM (pulse width modulation) clock that defines a length of the cycle for the switching transistor; and a counter structured to count the PWM clock, and wherein the pulse generator is structured to transit to the second period when a count value of the counter reaches a predetermined number after a transition to the first period.

12. The control circuit according to claim 5, wherein the pulse generator further comprises a timer circuit, and wherein the pulse generator is structured to transit to the second period when the timer circuit detects that a predetermined time period has elapsed after a transition to the first period.

13. An in-vehicle power supply apparatus comprising the step-down DC/DC converter according to claim 10.

14. A control circuit for controlling a step-down DC/DC converter including an N-channel switching transistor, the control circuit comprising:

a pulse generator structured to generate a pulse signal for instructing the switching transistor to turn on and off such that an output voltage of the step-down DC/DC converter approaches a target value;

a switching terminal to be coupled to a source of the switching transistor, and to be coupled to one end of a bootstrap capacitor;

a bootstrap terminal to be coupled to another end of the bootstrap terminal;

a bootstrap circuit structured to charge the bootstrap capacitor; and a driver having an upper-side power supply terminal coupled to the bootstrap terminal and having a lower-side power supply terminal coupled to the switching terminal, and structured to drive the switching transistor according to the pulse signal, wherein the pulse generator is structured to repeatedly switch between a first period and a second period when a voltage difference between an input voltage and an output of the step-down DC/DC converter becomes smaller than a predetermined value, and wherein (i) in the first period, the pulse signal is maintained at an on level over a plurality of cycles; and (ii) in the second period, the pulse signal is forcibly switched to the off level so as to charge the bootstrap capacitor by means of the bootstrap circuit.

15. A control method for controlling a step-down DC/DC converter that comprises an N-channel switching transistor and a bootstrap capacitor so as to operate according to a bootstrap method, the control method comprising:

generating a pulse signal for instructing the switching transistor to turn on and off such that an output voltage of the step-down DC/DC converter approaches a target value;

driving the switching transistor according to the pulse signal;

switching a mode to a skip mode when a cycle is detected in which there has been no transition of the pulse signal to an off level; and repeatedly switching a period in the skip mode between: (i) a first period in which the pulse signal is maintained at an on level over a plurality of cycles; and (ii) a second period in which the pulse signal is forcibly switched to an off level so as to charge the bootstrap capacitor by means of the bootstrap circuit.

\* \* \* \* \*